US011086724B1

(12) United States Patent
Tokuri et al.

(10) Patent No.: US 11,086,724 B1
(45) Date of Patent: Aug. 10, 2021

(54) SINGLE STEP MERGING OF A VIRTUAL HARD DISK CHAIN

(71) Applicant: EMC IP Holding Company LLC, Hopkinton, MA (US)

(72) Inventors: Suman C Tokuri, Bangalore (IN); Pradeep Anappa, Bangalore (IN); Sunil Yadav, Bangalore (IN); Soumen Acharya, Bangalore (IN); Sudha V Hebsur, Bangalore (IN); Aaditya R Bansal, Bathinda (IN)

(73) Assignee: EMC IP Holding Company LLC, Hopkinton, MA (US)

(*) Notice: Subject to any disclaimer, the term of this patent is extended or adjusted under 35 U.S.C. 154(b) by 105 days.

(21) Appl. No.: 15/786,881

(22) Filed: Oct. 18, 2017

(51) Int. Cl.
*G06F 11/14* (2006.01)
*G06F 11/07* (2006.01)
*G06F 16/22* (2019.01)
*G06F 9/455* (2018.01)

(52) U.S. Cl.
CPC ........ *G06F 11/1451* (2013.01); *G06F 11/073* (2013.01); *G06F 11/0712* (2013.01); *G06F 11/1456* (2013.01); *G06F 16/2237* (2019.01); *G06F 2009/45583* (2013.01)

(58) Field of Classification Search
None
See application file for complete search history.

(56) References Cited

U.S. PATENT DOCUMENTS

| | | | |
|---|---|---|---|
| 7,216,254 B1* | 5/2007 | Rajan | G06F 11/1435 714/15 |
| 2013/0151810 A1* | 6/2013 | Beaman | G06F 16/2255 711/216 |
| 2013/0219069 A1* | 8/2013 | Yellapragada | G06F 3/0664 709/226 |
| 2015/0178105 A1* | 6/2015 | Graham | G06F 8/658 718/1 |
| 2019/0025991 A1* | 1/2019 | Bonchev | G06F 3/0653 |

* cited by examiner

Primary Examiner — Charles Rones
Assistant Examiner — Jonah C Krieger
(74) *Attorney, Agent, or Firm* — Staniford Tomita LLP

(57) ABSTRACT

Embodiments for a method of backing up virtual hard disks by: parsing a list of base parent and differencing disks to identify disk parameters and child disks of immediate parent disks; creating a differencing disk chain in reverse time order of modification of the base parent disk starting from the base parent disk to a latest child differencing disk; identifying changed sectors in each child disk starting from the latest child differencing disk; creating a list detailing a respective differencing disk, sector offsets and logical data sector index for each changed sector; iteratively adding updated sectors to the list for latest changed sectors that were not previously added to the list by a later child disk by reading the changed sectors from their respective child disk; and merging, in a single step, the changed sectors read from their respective child disks into the base parent disk.

13 Claims, 6 Drawing Sheets

SINGLE STEP MERGING OF A VIRTUAL HARD DISK CHAIN

TECHNICAL FIELD

Embodiments are generally directed to data backup and recovery in virtual hard disk (VHD) networks, and more specifically to performing synthetic full backup recovery in a single-merge step of differencing disks.

BACKGROUND

Backup and recovery software products are crucial for enterprise level network clients. Customers rely on backup systems to efficiently back up and recover data in the event of user error, data loss, system outages, hardware failure, or other catastrophic events to allow business applications to remain in service or quickly come back up to service after a failure condition or an outage. The advent of virtualization technology has led to the increased use of virtual machines as data storage targets. Virtual machine (VM) backup and disaster recovery systems using hypervisor platforms, such as vSphere from VMware or Hyper-V from Microsoft, among others, have been developed to provide recovery for various different needs, such as data migration, disaster recovery, regular scheduled backups (hourly, daily, etc.), and so on.

Popular backup platforms (e.g., EMC Networker) support block-based backups (BBB) of volumes and files in a virtual hard disk (VHD or VHDx) format. The files to be backed up are virtual hard disk files that may be formatted as a VHD (Microsoft Virtual Hard Disk Image) or Microsoft VHDx file. The VHDx format is a container format, which can contain disk related information. VHDx files can be mounted and used as a regular disk. Volumes such as NTFS/ReFS/FAT32 or any file system which the OS supports on the mounted disk can also be created. A VHD is a file format that represents a virtual hard disk drive (HDD). It may contain what is found on a physical HDD, such as disk partitions and a file system, which in turn can contain files and folders.

A snapshot is a point-in-time copy of data created from a set of markers pointing to stored data and serves as a means to provide rapidly accessible copies to which is it possible to roll back. In Hyper-V systems, snapshots are now referred to as checkpoints. Physically, a Hyper-V checkpoint is a differencing virtual hard disk. Once the checkpoint is taken, the differencing disk becomes a place where temporary changes to the virtual machine's original disk are stored, while an original disk remains read-only. Logically, a Hyper-V checkpoint is a consistent state of a virtual machine in a specific point in time. This allows the system to preserve a particular state for a while and revert back to it if needed due to a problem with the current state of a VM. Checkpoints thus provide a fast and easy way to revert a VM to a previous state, and are intended primarily for use in development and test environments. In certain cases, checkpoints are used in a production environment, such as applying an update to the software running in the VM.

Differencing virtual hard disks in a Hyper-V framework are used in backup and recovery scenarios to store changes made in the disk since the last snapshot (user checkpoint or recovery snapshot). In production environments, a recovery snapshot coupled with numerous user checkpoints results in a chain of differencing hard disks per parent or base disk.

What is needed, therefore, is a backup method for VHD and VHDx systems that merge differencing disks in an orderly fashion for efficient and successful recovery and data consistency.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Networker, Data Domain, and Data Domain Restorer are trademarks of Dell EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
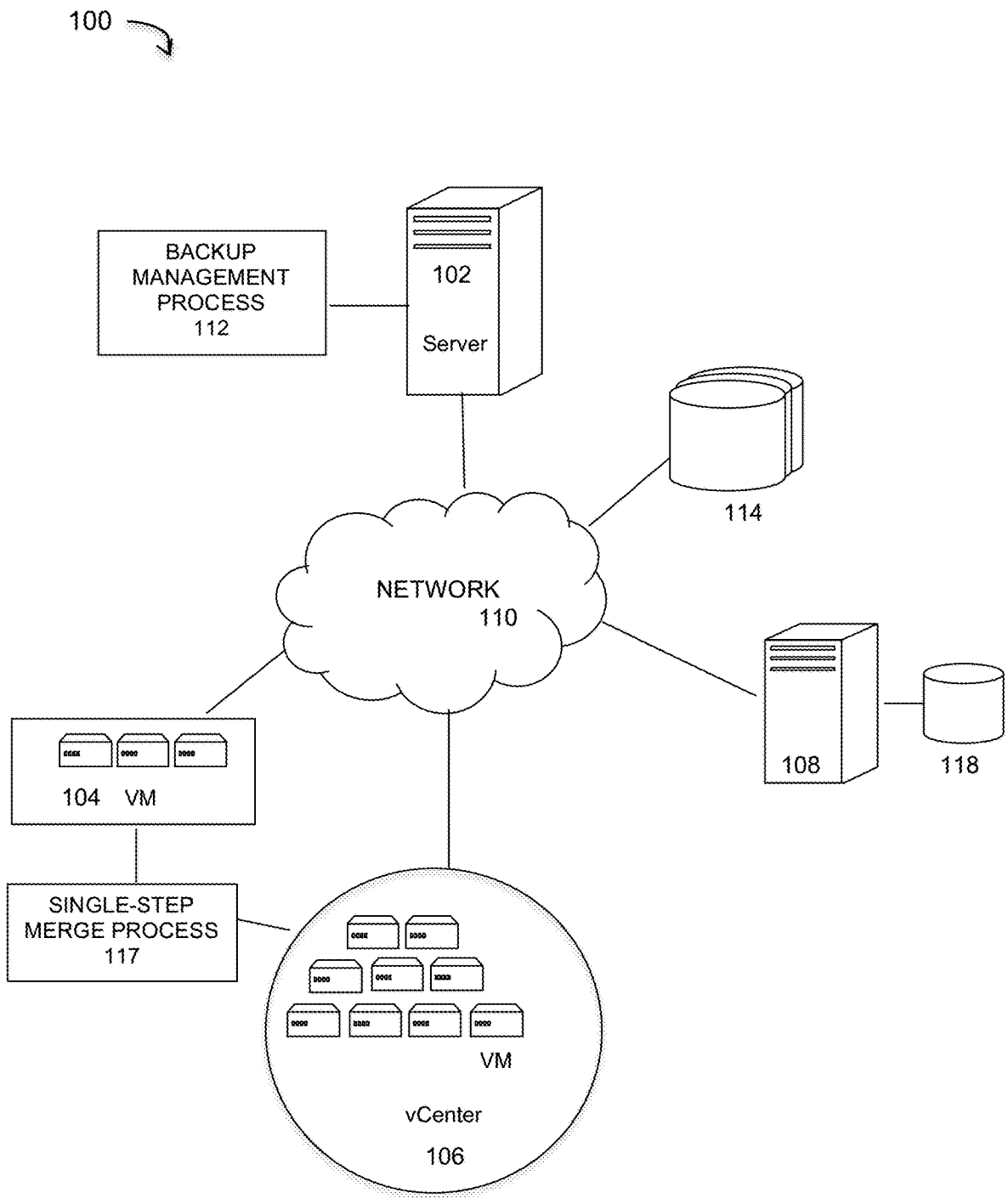
FIG. 1 is a diagram of a large-scale network implementing a differencing disk single-step merging process, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of a virtual hard disk (VHD) merging process in a Hyper-V based backup system. In system 100, a number of VMs or groups of VMs 104 are provided to serve as backup targets. Target VMs may also be organized into one or more vCenters (virtual centers) 106 representing a physical or virtual network of many virtual machines (VMs), such as on the order of thousands of VMs each. The VMs serve as target storage devices for data backed up from one or more data sources, such as computer 108, which may have attached local storage 118 or utilize networked accessed storage devices 114. The data sourced by the data source may be any appropriate data, such as database data that is part of a database management system. In this case, the data may reside on one or more hard drives (118 and/or 114) and may be stored in the database in a variety of formats. One example is an Extensible Markup Language (XML) database, which is a data persistence software system that allows data to be stored in XML format. Another example is a relational database management system (RDMS) which uses tables to store the information. Computer 108 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server applications.

A network server computer 102 is coupled directly or indirectly to the target VMs 104 and 106, and to the data source 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118), or network storage (e.g., 114), which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (OpenStorage) devices. In a preferred embodiment, the data source storage is provided through VM or physical storage devices, and the target storage devices represent disk-based targets implemented through virtual machine technology.

For the embodiment of FIG. 1, network system 100 includes a server 102 that executes a backup management process 112 automates the backup of network data using the target VM devices. In an embodiment, the process 112 uses certain known full and incremental (or differencing) backup techniques along with a snapshot backup process that is used to store an image or images of the system(s) to be backed up prior to the full or incremental backup operations. In an embodiment, system 100 may represent a Data Domain Restorer (DDR)-based deduplication storage system, and storage server 128 may be implemented as a DDR Deduplication Storage server provided by EMC Corporation. However, other similar backup and storage systems are also possible.

As is known, virtual machine environments utilize hypervisors (e.g., Hyper-V) to create and run the virtual machines.

A computer running the hypervisor is a host machine and all virtual machines are guest machines running guest operating systems (OS). The hypervisor provides the guest operating systems with a virtual operating platform and manages the execution of the VMs. In an embodiment, the backup management process 112 is configured to operate with the Hyper-V hypervisor, which is a native hypervisor that creates VMs on Intel x86-64 based systems and is an integral part of the Microsoft Windows server products. In general, Hyper-V implements isolation of virtual machines in terms of a partition, which is a logical unit of isolation, supported by the hypervisor, in which each guest operating system executes. A hypervisor instance has to have at least one parent partition. The virtualization stack runs in the parent partition and has direct access to the hardware devices. The parent partition then creates the child partitions which host the guest OSs, typically by using an API.

In an embodiment, system 100 represents a backup platform (e.g., EMC Networker) that supports block-based backups (BBB) of volumes and files in a virtual hard disk (VHD or VHDx) format. For this embodiment, the files to be backed up are virtual hard disk files that may be formatted as a VHD (Microsoft Virtual Hard Disk Image) or Microsoft VHDx file. The VHDx format is a container format, which can contain disk related information. VHDx files can be mounted and used as a regular disk. Volumes such as NTFS/ReFS/FAT32 or any file system which the OS supports on the mounted disk can also be created.

FIG. 1 is a diagram of a large-scale network implementing a differencing disk single-step merging process, under some embodiments. The backup process 112 uses snapshot backups as a read-only copy of a volume at a particular point in time. Snapshots allow for the creation of consistent backups of a volume and ensure that contents do not change and are not locked while the backup is in progress. Snapshots are typically the first step in any incremental or full backup session.

In a Hyper-V environment, snapshots are called Hyper-V checkpoints (or simply "checkpoints") that comprise a differencing virtual hard disk. In general, creating a checkpoint on a virtual machine creates a differencing disk for each disk on the virtual machine. All changes are tracked on the differencing disk and the original disk becomes a read-only disk. This creates a chain of checkpoints that must be checked for every block of every sector during data recovery. In present systems, where there is a chain of virtual hard disks being recovered, the system recovers all disks on-site and uses an application to merge the disks to produce a successfully recovered VM. An iterative approach is used to merge the last child differencing disk to its immediate parent and this continues until the base virtual hard disk is reached.

As a simple example of a present system, consider three disks numbered 1 2 3 so that if changes are made at each stage, the system creates a differencing disk 1, a differencing disk 2, and a differencing disk 3. The recovery process first goes to differencing disk 3 to see whether or not there is valid data or not; if not, it then goes to differencing disk 2 to see whether there is valid data or not; if not it then goes to differencing disk 1 to see whether there is valid data or not. This process is performed for every block of every sector, and can result in a huge number of checks since a production environment can have anywhere from 1 to 100 disks or more, and the Hyper-V hypervisor has 256 disks per VM. This means the number of checkpoints is virtually limitless and the differencing chain to access each block can increase to tremendous numbers as the process needs to go through all the differencing disks in the chain to get to the parent. In a system where disks can be on the order of 1 TB size capacity, and with 500 KB per sector, there is a clear tradeoff between setting checkpoints and maintaining the performance of the system. In fact, Microsoft presently recommends setting a maximum number of checkpoints, and warns of possible performance decreases if this number is exceeded.

Figure 2:
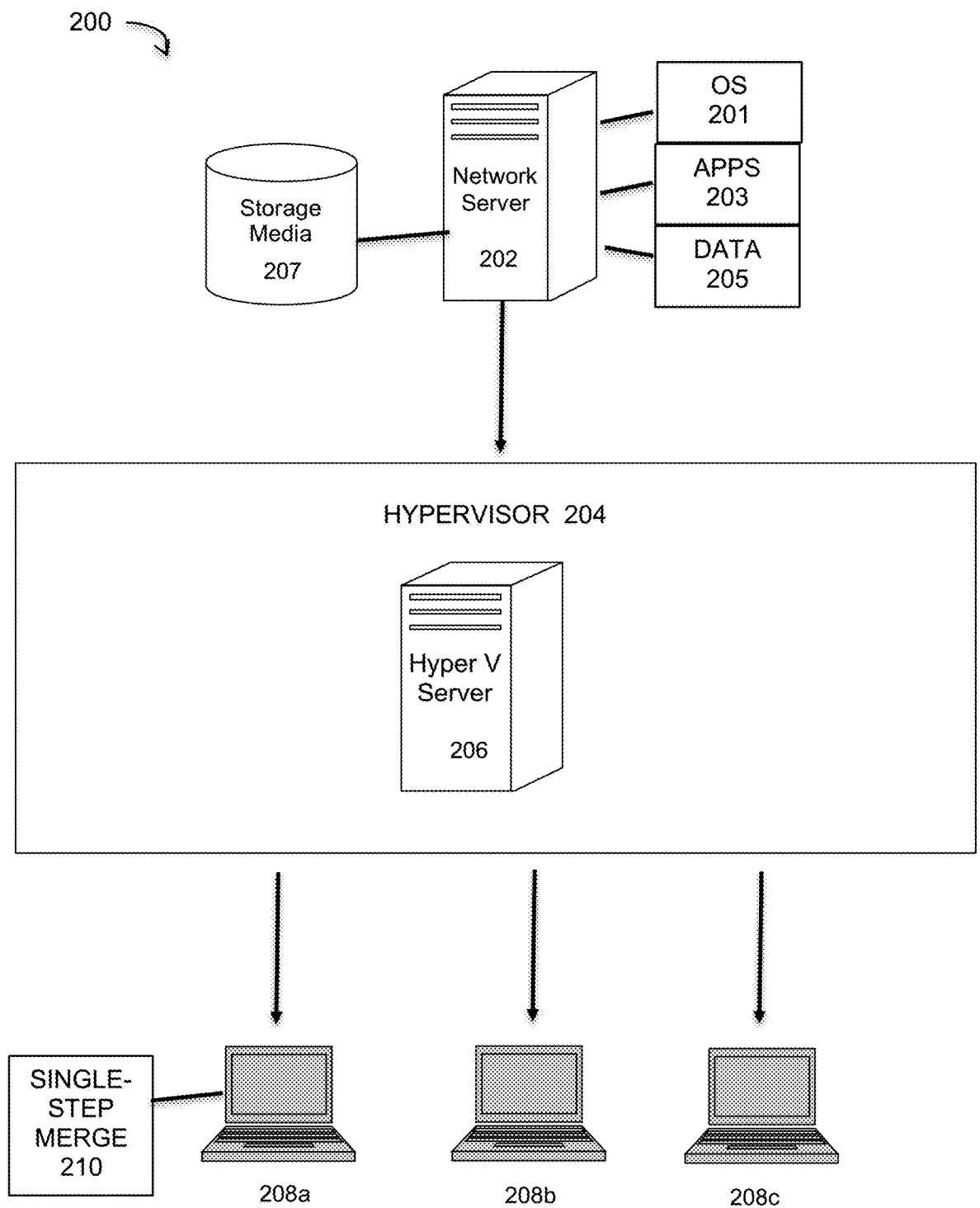
FIG. 2 illustrates the single-step merge process in the context of a Hyper-V environment, under some embodiments.

As shown in FIG. 1, system 100 includes a merge process 117 that merges a differencing disk chain to its parent virtual hard disk in a single-step. In an embodiment, this process 117 is run on the client-side as a plug-in application. FIG. 2 illustrates the single-step merge process in the context of a Hyper-V environment, under some embodiments. In an embodiment, the system 200 implements a Hyper-V hypervisor that creates virtual machines on certain computer systems, such as x86-64 and Windows-based systems. In such an embodiment, a Hyper-V server computer is configured to expose individual virtual machines to one or more networks.

A network server 202 runs certain resources, such as an operating system 201, applications 203, data 205, and access to network storage media 207. The hypervisors layer 204 is supported by Hyper-V server 206, and the single-step merge process 210 is run as a plug-in on each client computer 208a-c. In an embodiment, system 200 implements the data backup system 100 of FIG. 1 in which the storage server 102 includes interfaces to other VM-based backup targets to store data backed up from a data source or other clients. The backed-up data may include a volume, portion of a volume, applications, services, user-generated or user data, logs, files, directories, databases, operating system information, configuration files, machine data, system data, and so forth. For system 200, the VMs include volumes that store information that needs to be backed up through a backup operation executed by the backup agent on each client 208a-c. Volumes may be associated with a database or repository or other data source, and the backup process backs up each virtual machine, which are represented as virtual disks. The file system may be configured to store any and all back up information related to the virtual disk files, and the files containing the VM data may be created based on a virtual disk format and may contain information typically contained in a physical volume. For some embodiments, the files may be created based on the Hyper-V Virtual Hard Disk (VHDX) format according to the VHDX Format Specification, published by Microsoft Corp. and may be referred to as VHDx files and may be mounted by an operating system that supports VHDx files.

In an embodiment, the single-step merge process 210 utilizes a disk parsing algorithm to identify the changed sectors in a differencing disk in relation to its immediate parent disk. It continues to identify the unique changed sectors in a bottom-up approach until it reaches the parent disk. In a single step, it then merges the varied changed sectors across the different hard disks in the original location, while performing a backup operation. This method also optimizes granular level recovery operations. During backup, the different disks are not stored as separate files, but as a single merged unit. This eliminates any merging required at the time of restore.

In general, the backup system 100 may implement any type of backup process including full, incremental, differential, synthetic full, incremental full, and reverse incremental backups. Embodiments of the merge process work with synthetic full backups in which a full backup is combined with subsequent incremental backups to provide a full backup that is always up to date. In a Hyper-V system, the restore points are marked by checkpoints, and a Windows Hyper-V manager snapshot may be depicted as a chain of user checkpoints as follows:

Parent→1st differencing disk→2nd differencing disk→ . . . →Nth differencing disk Such a chain may be displayed through any appropriate GUI (graphical user interface) display window in a vertical, horizontal, diagonal, or nested hierarchy, or any other appropriate format.

Figure 3:
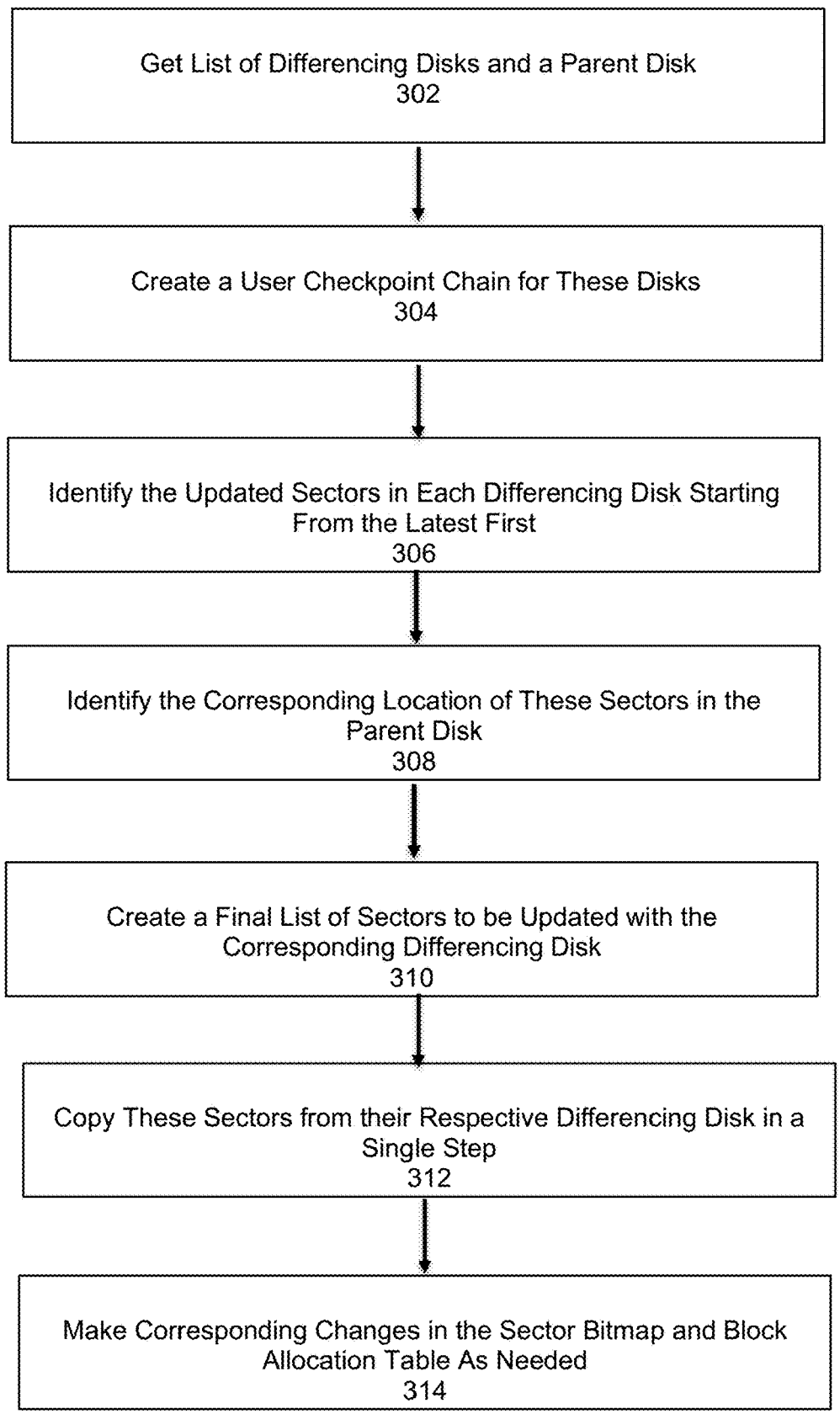
FIG. 3 is a flowchart that illustrates a method of performing a single-step merging of VHD differencing disks, under some embodiments.

FIG. 3 is a flowchart that illustrates a method of performing a single-step merging of VHD differencing disks, under some embodiments. The process of FIG. 3 begins in step 302 with a list of virtual hard disks, where the list contains a single parent and a number of differencing disks, such as shown above. The differencing disks are typically denoted from 1 to N. The disks are parsed to identify the various parameters and the immediate parent to each differencing disk. After validation, the process creates a chain starting from the parent disk to the latest child differencing disk, step 304. Starting from the latest child differencing disk, the process then identifies the changed or updated sectors in this disk and creates a list with details of the disk, the sector's offsets and the logical data sector index, step 306. The process then moves to the immediate parent disk and identifies the updated sectors there, step 308. Since the latest changes in a sector are present in the latest disk, only the updated sector indexes (along with their offsets) which were not present in the prior list are added into the list. This procedure is continued until the base/parent virtual hard disk is reached.

At the end of this continuation, the process yields an effective list of changed sectors along with the details of their offsets in their respective differencing disks. Thus, step 310 involves creating a final list of sectors to be updated with the corresponding differencing disk. The list is iterated through and changed sectors are read from their respective differencing disks and merged into the parent disk in a single step, step 312. At this stage, a new block may be allocated (in case the base disk is a dynamic virtual disk) in the parent disk if the updated sector list points to a non-existent block in the parent disk. In step 314, the sector bitmaps and block allocation table (BAT) entry table is updated so that the parent disk reflects all the changes made.

In general, a BAT is a table of absolute sector offsets into the file backing up the hard disk. It is pointed to by the "Table Offset" field of the dynamic disk header. The size of the BAT is calculated during creation of the hard disk. The number of entries in the BAT is the number of blocks needed to store the contents of the disk when fully expanded. Each data block consists of a sector bitmap and data. For dynamic disks, the sector bitmap indicates which sectors contain valid data (1's) and which sectors have never been modified (0's). The bitmap is padded to a 512-byte sector boundary.

Figures 4, 5:
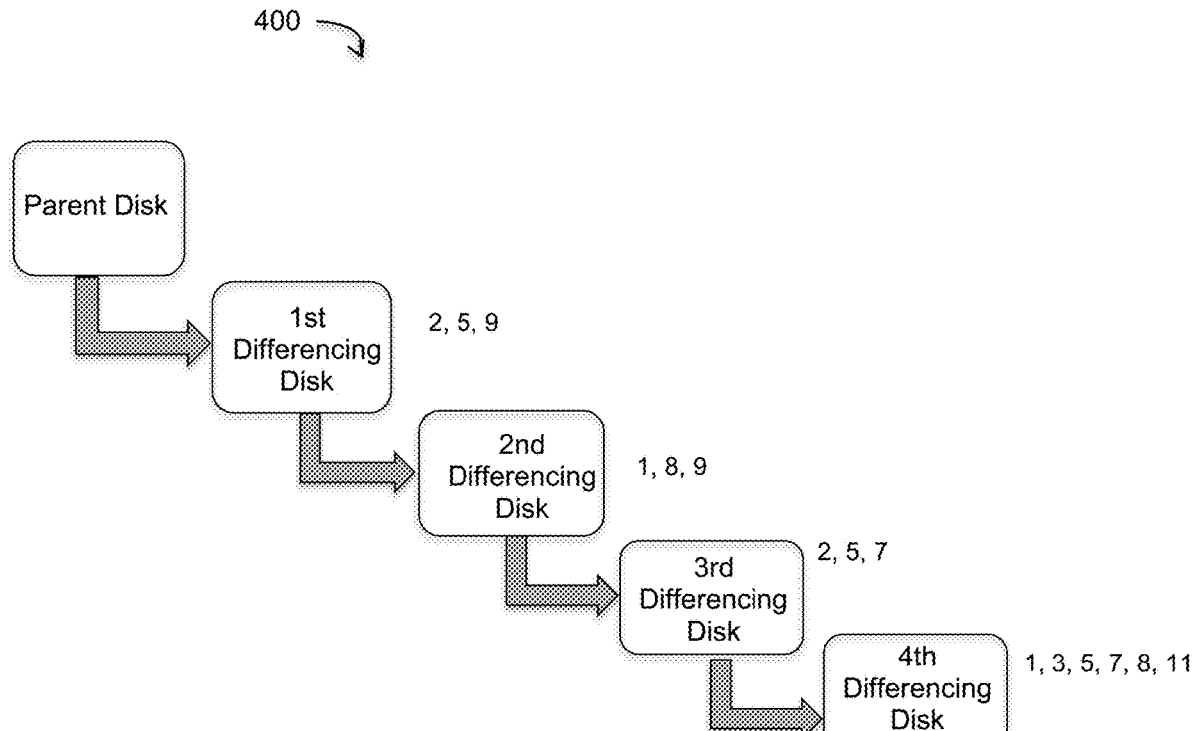
FIG. 4 illustrates a representation of user checkpoints with example updated sectors in particular differencing disks.
FIG. 5 is a table that illustrates information about the updated sectors in each differencing disk of FIG. 4.

FIG. 4 illustrates a representation of user checkpoints with example updated sectors in particular differencing disks. Diagram 400 of FIG. 4 illustrates a parent disk with four differencing disks (N=4), and a set of updated sectors for each of differencing disks 1 to 4. Thus, for the example of FIG. 4, the 1st differencing disk has updated sectors 2, 5, 9; the 2nd differencing disk has updated sectors 1, 8, 9; the 3rd differencing disk has updated sectors 2, 5, 7; and the 4th differencing disk has updated sectors 1, 3, 5, 7, 8, 11.

FIG. 5 is a table that illustrates information about the updated sectors in each differencing disk of FIG. 4. As shown in table 500 of FIG. 5, the updated sectors with respect to an immediate parent disk for each differencing disk match the numbers shown in FIG. 4 for each of the 1st, 2nd, 3rd, and 4th disks. The sectors added to the final list from a particular differencing disk starting from the 4th disk back to the parent is as shown. For the 4th disk, since this is the first disk adding sectors to the final list, all of the 4th differencing disk sectors are added, namely sectors 1, 3, 5, 7, 8, 11. The 3rd differencing disk is then considered, and in this case only adds sector 2 since sectors 5 and 7 were already added by the 4th differencing disk. Likewise, the 2nd differencing disk adds only sector 9, and the 1st differencing disk adds no sectors, since its sectors 2, 5, 9 were already added by the 2nd, 3rd, and 4th differencing disks.

Figure 6:
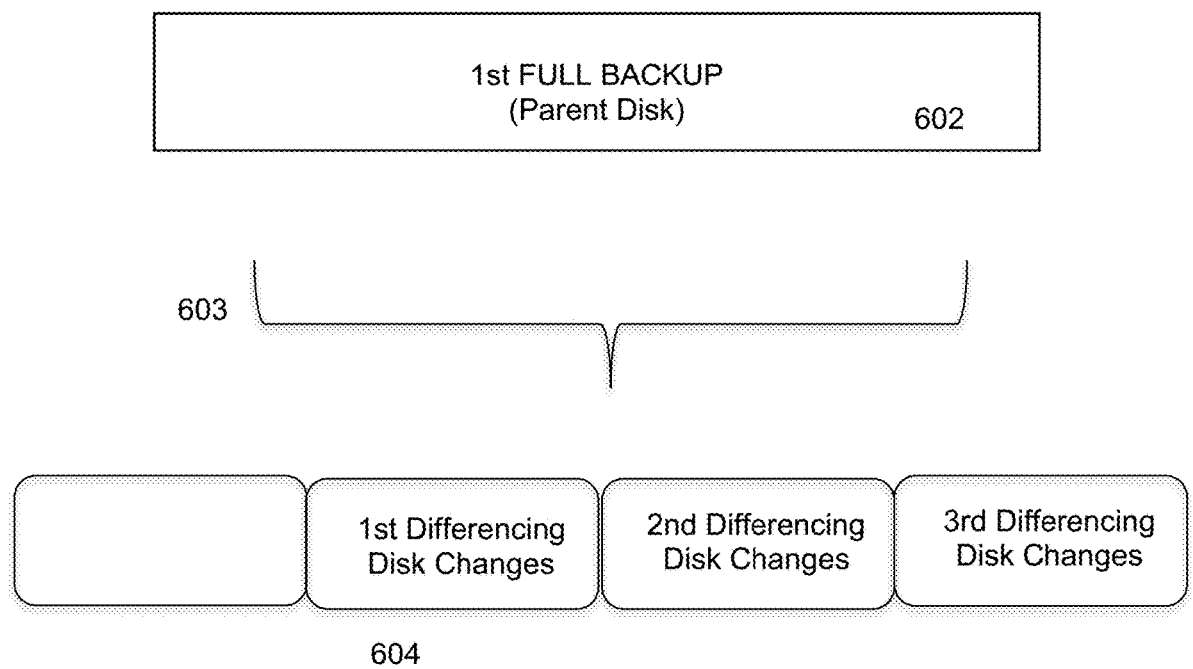
FIG. 6 illustrates generating a single disk with changes in differencing disks merged, under some embodiments.

FIG. 6 illustrates generating a single disk with changes in differencing disks merged, under some embodiments. For this embodiment, the backup system performs a synthesized full backup process on a first full backup 602. The process takes the checkpoints, goes to the VM and identifies changed blocks and sectors, creates a data stream of the blocks and sectors and sends them to the server, this gets merged 603 onto a parent image on the backup server. The result is a single disk 604 containing the base disk 602 merged with the changes in all the differencing disks as a result of the new backup operation. Although FIG. 6 only shows three differencing disks, any practical number of differencing disks can be used depending on the number of checkpoints that are set. This single-step merging to produce a single disk with all the changes is in distinct contrast to existing methods that produce a differencing disk chain of separate and individual differencing disks.

In an embodiment, the single-step merging process uses a hash table and goes through each differencing disk (disk 1 to disk N), and in each disk, identifies all sectors that are valid and maps the sectors with respect to their exact location on the disk. For each later disk accessed, the sectors that have already been identified valid are not added to the map. The number of sectors generated is thus hugely reduced compared to present methods because the process does not read each block and the iteration is not simply repetitive. In the first iteration, starting from the latest differencing disk, the process picks up the valid blocks and checks for valid sectors; if valid, the process does not check other differencing disks. The map is updated based on the latest changes and is not updated for earlier changes, in comparison to present methods that maintain images for each differencing disk regardless of later changes.

Although embodiments have been described with respect to network backup comprising certain specific technologies, such as Hyper-V servers, and certain backup agents or processes, it should be noted that embodiments are not so limited, and that other backup systems and methods may also utilize the single-step differencing disk merge methods described herein.

As described above, in an embodiment, system 100 includes a single-step merging process that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein.

Figure 7:
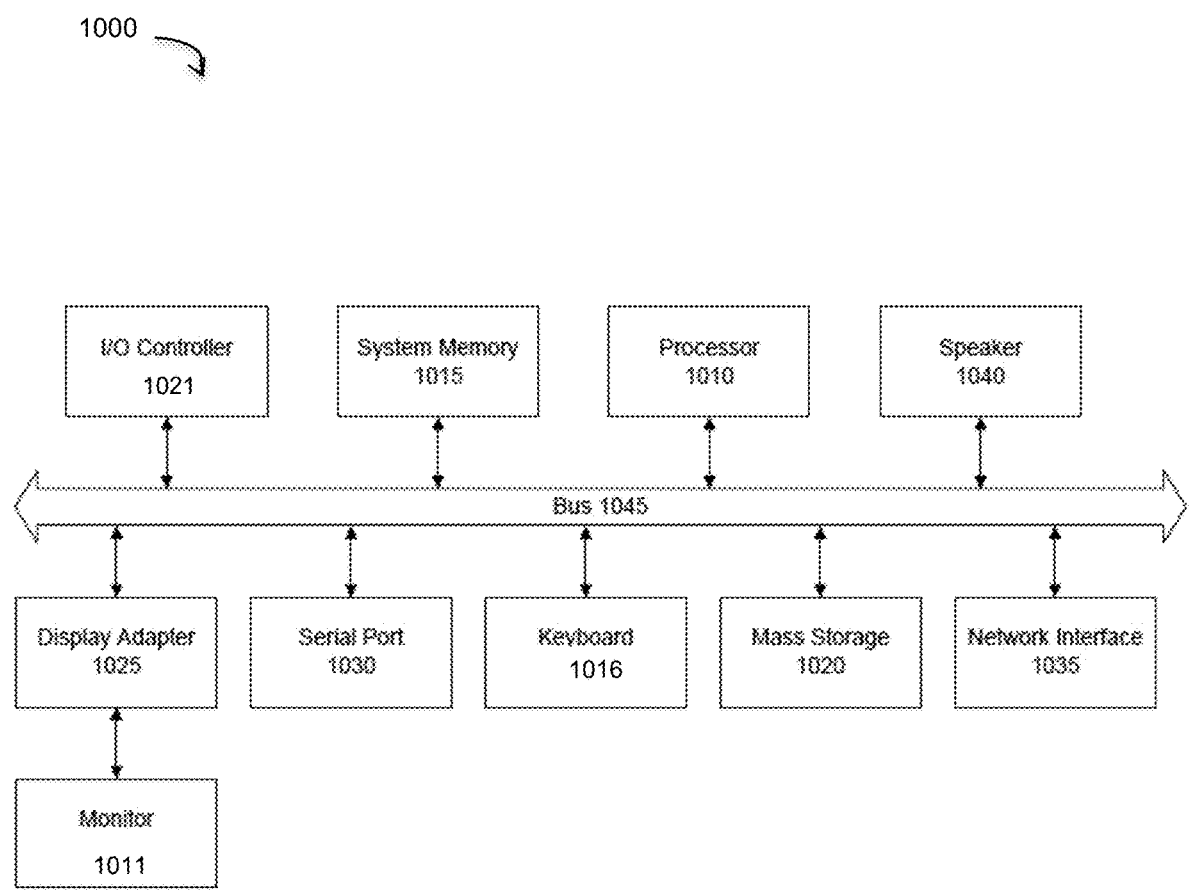
FIG. 7 is a block diagram of a computer system used to execute one or more software components of a system for single-step merging of VHD differencing disks, under some embodiments.

FIG. 7 is a block diagram of a computer system used to execute one or more software components of a system for single-step merging of VHD differencing disks, under some embodiments. The computer system 1000 includes a monitor 1011, keyboard 1016, and mass storage devices 1022. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 7 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®, family of systems (e.g., Windows Server), Linux, Mac OS X, IRX32, or IRX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of backing up and recovering virtual hard disks in a large-scale data storage system, comprising:
    creating, for a parent disk and set of differencing disks, a checkpoint chain identifying checkpoints set during snapshot backup operations on the virtual hard disks;
    identifying changed sectors in each differencing disk starting with the latest differencing disk and proceeding in order back to the parent disk through each earlier differencing disk in a disk parsing process to identify changed sectors in each differencing disk relative to the parent disk;
    storing the identified changed sectors for each differencing disk in a first set of respective entries in a table;
    identifying a corresponding location of the identified changed sectors in the parent disk;
    comparing changed sectors in each differencing disk with changed sectors in all earlier differencing disks to find matching changed sectors;
    storing changed sectors for each differencing disk not matching changed sectors in all earlier differencing disks in a second set of respective entries in the table;
    creating a final list of sectors to be updated with an identification of their corresponding differencing disk by combining all changed sectors from the second set of respective entries, wherein the final list of sectors contains only a latest change of the identified changed sectors for all the differencing disks to prevent redundant updates of sectors changed in two or more differencing disks; and
    copying, in a single merge step using a hash table and a mapping using the second set of respective entities, the identified changed sectors of the final list of sectors and read from their respective differencing disks to a parent disk image stored on the backup server computer.

2. The method of claim 1 further comprising updating a sector bitmap and block allocation table (BAT) with the copied sectors through the mapping, and wherein for later disks in the copying step, sectors already identified as valid are not updated to the sector bitmap.

3. The method of claim 1 further comprising displaying, through a graphical user interface (GUI) the parent disk and the set of differencing disks in a hierarchical format.

4. The method of claim 1 wherein an immediately earlier differencing disk represents a parent disk to a current differencing disk, and further wherein the final list of sectors and corresponding differencing disks comprises a sequential map of updated sectors from latest to earliest in time.

5. The method of claim 1 wherein the backup server computer is part of a virtualized network comprising a hypervisor server computer and a plurality of virtual machine storage targets storing the parent disk as the virtual hard disks.

6. The method of claim 5 wherein the virtual hard disks are formatted in a VHD or VHDX format.

7. The method of claim 6 wherein each checkpoint comprises a hypervisor checkpoint constituting a respective differencing virtual hard disk.

8. The method of claim 7 wherein, once a checkpoint is taken, the respective differencing disk temporarily stores changes comprising sector updates or modifications to a host virtual machine original disk and rendering the parent disk as a read-only disk.

9. The method of claim 2 wherein the BAT comprises a table of absolute sector offsets to a file backing up the parent disk, and is pointed to by a table offset field of a dynamic disk header, and wherein the sector bitmap indicates which sectors contain valid data through a first bit state and which sectors have not been modified through a second bit state.

10. The method of claim 1 wherein the snapshot backup operation comprises a point-in-time, read-only backup of one or more files or volumes on the virtual hard disks, and wherein the backup operation comprises a full synthetic backup.

11. A system comprising a hardware processor for backing up and restoring virtual machines in a large-scale data storage system, comprising:

an identifying component creating, for a parent disk and set of differencing disks, a checkpoint chain identifying checkpoints set during snapshot backup operations on the virtual hard disks, and identifying changed sectors in each differencing disk relative to the parent disk starting with the latest differencing disk and proceeding, in a bottom-up approach, in order back to the parent disk through each earlier differencing disk, and identifying a corresponding location of the identified changed sectors in the parent disk, and storing the identified changed sectors for each differencing disk in a first set of respective entries in a table, comparing changed sectors in each differencing disk with changed sectors in all earlier differencing disks to find matching changed sectors, and storing changed sectors for each differencing disk not matching changed sectors in all earlier differencing disks in a second set of respective entries in the table;

a hardware client-side merge component creating, during a backup operation, a final list of sectors to be updated with an identification of their corresponding differencing disk by combining all changed sectors from the second set of respective entries, wherein the final list of sectors contains only a latest change of the identified changed sectors for all the differencing disks to prevent redundant updates of sectors changed in two or more differencing disks, and copying, in a single-step merge function using a hash table and a mapping using the second set of respective entities, the identified changed sectors of the final list of sectors and read from their respective differencing disks to a parent disk image stored on the backup server computer; and an updating component updating a sector bitmap and block allocation table (BAT) with the copied sectors.

12. The system of claim 11 wherein an immediately earlier differencing disk represents a parent disk to a current differencing disk, and wherein the final list of sectors and corresponding differencing disks comprises a sequential map of updated sectors from latest to earliest in time.

13. The system of claim 12 wherein the backup server computer is part of a virtualized network comprising a hypervisor server computer and a plurality of virtual machine storage targets storing the parent disk as the virtual hard disks, and further comprising a hypervisor server, and wherein the virtual hard disks are formatted in a VHD or VHDX format, and wherein each checkpoint constitutes a respective differencing virtual hard disk.

* * * * *